United States Patent
Bates et al.

(10) Patent No.: US 6,222,541 B1
(45) Date of Patent: *Apr. 24, 2001

(54) METHOD AND APPARATUS FOR FAST-PATH LOCATION AND SELECTION OF LINKS

(75) Inventors: Cary Lee Bates; Paul Reuben Day, both of Rochester, MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/009,203

(22) Filed: Jan. 20, 1998

(51) Int. Cl.[7] .................................................. G06F 13/00
(52) U.S. Cl. ............................ 345/341; 345/973; 345/974
(58) Field of Search ................................. 345/973, 974, 345/123, 341, 146, 968; 707/512, 513

(56) References Cited

U.S. PATENT DOCUMENTS

| 5,479,600 | * | 12/1995 | Wroblewski et al. | 345/973 |
| 5,550,559 | * | 8/1996 | Isensee et al. | 345/124 |
| 5,550,969 | | 8/1996 | Torres et al. | 395/159 |
| 5,623,588 | * | 4/1997 | Gould | 345/326 |
| 5,721,847 | | 2/1998 | Johnson | 395/333 |
| 5,877,757 | * | 3/1999 | Baldwin et al. | 345/336 |
| 5,987,482 | * | 11/1999 | Bates et al. | 707/513 |

* cited by examiner

*Primary Examiner*—Ba Huynh
(74) *Attorney, Agent, or Firm*—Schmeiser, Olsen & Watts; Steven W. Roth

(57) ABSTRACT

An apparatus and method for locating and selecting hypertext links allows a web user to select a web page, then quickly and efficiently locate and select any hypertext link on the web page. A web user simply navigates to a web page and scrolls through the web page using the slider on the scroll bar. As the web user scrolls through the page, each link that appears on the screen is displayed in one of several predefined colors with no two adjacent links being displayed in the same color. When a given hypertext link is within the range of the slider on the scroll bar, this link becomes the current or active link and the slider on the scroll bar changes to a color which corresponds to the color of the link. The color change provides a visual cue to the user that the current or active link can now be selected. In addition, when the slider changes color, a link display on the menu bar of the web browser may be used to display the title of the current or active link as indicated by an HTML tag in the web page corresponding to the link. As long as the slider remains the color corresponding to the link and the link display shows the title of the active link, the user can select the link by simply pressing the right button of the mouse or using some other selection method.

52 Claims, 10 Drawing Sheets

METHOD AND APPARATUS FOR FAST-PATH LOCATION AND SELECTION OF LINKS

BACKGROUND OF THE INVENTION

1. Technical Field

This invention generally relates to interactions on the world-wide web and more specifically relates to a method and apparatus for user interaction with web browser interfaces.

2. Background Art

The development of the EDVAC computer system of 1948 is often cited as the beginning of the computer era. Since that time, computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users to communicate with each other.

Computer systems typically include operating system software that controls the basic function of the computer, and one or more software applications that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software applications designed for high performance computer systems have become extremely powerful.

Other changes in technology have also profoundly affected how we use computers. For example, the widespread proliferation of computers prompted the development of computer networks that allow computers to communicate with each other. With the introduction of the personal computer (PC), computing became accessible to large numbers of people. Networks for personal computers were developed to allow individual users to communicate with each other. In this manner, a large number of people within a company could communicate with other computer users in a convenient and efficient manner.

One significant computer network that has recently become very popular is the Internet. The Internet grew out of the modern proliferation of computers and networks, and has evolved into a sophisticated worldwide network of computer systems linked together by web pages that collectively make up the "World-Wide Web", or WWW. A user at an individual PC (i.e., workstation) that wishes to access the WWW typically does so using a software application known as a web browser. A web browser makes a connection via the WWW to other computers known as web servers, and receives information from a web server that is displayed on the user's workstation. Information displayed for the user is typically organized into web pages that are constructed using a specialized language called Hypertext Markup Language (HTML).

Many HTML web pages include one or more special reference locations known as hypertext "links" that invoke or load other web pages for a web user to view. Hypertext links allow a web user to easily navigate to other web pages or sites of interest by simply clicking on the appropriate hypertext link with a mouse or other pointing device. After the web user clicks on the desired link, the web browser software uses the network address associated with that link to find the computer where the desired web page is located. Once the host computer is contacted, the web server computer sends the HTML information for the requested web page associated with the hypertext link selected by the web user. The web page associated with the selected hypertext link is then displayed by the web browser software on the user's computer.

Selectable hypertext links typically appear on a web page as highlighted text displayed in a different color to distinguish the hypertext links from other, non-selectable, text on the web page. Differentiating hypertext links from other text on the web page by using a different color helps the user to efficiently locate and select links. Typically, the web browser displays all links on a web page that have been previously visited in one color and all links that have not been visited in another, different color.

Often, a web user will scroll through a web page in order to quickly locate a particular link on the web page. Web browser interfaces typically have a scroll bar located along the right edge of the screen which allows a user to "scroll" or navigate through the contents of the web page. Within the scroll bar is a small "puck" or "slider" which represents the relative position of the currently displayed information in relation to the other text on the web page. The user will typically click on the scroll bar and/or position the slider portion of the scroll bar in order to scroll or navigate through the contents of the web page. Although scroll bars effectively scroll through the web page, several problems occur when using the scroll bar to locate and select desired hypertext links.

For example, many times the web page scrolls by too quickly and the user misses the desired link. Further, even when the user successfully locates the desired link, it can be a tedious, time-consuming exercise to select the desired link. The process of selecting a given link involves moving the cursor away from the scroll bar, navigating the cursor to the desired link, and then clicking on the link. In other words, most web browsers require a user to have fairly specific knowledge of the location of a link on a web page before scrolling through a web page to locate and activate the link. Another problem encountered by a user is that if the user needs to locate and activate 20 different links on a web page, the user must manually scroll through each web page to find each link and reposition the mouse to select each of the 20 links. Needless to say, this process can be very time consuming and error-prone.

Another problem with current link selection techniques stems from the physical limitations of individuals using the WWW. The exploding population of web users includes individuals of all ages, spanning from the very young to the very elderly. The process of locating and selecting hypertext links using presently available methods can be very difficult for individuals with limited fine motor control, such as the young and the elderly. Devices such as track balls and touch pads require significant skill and fine motor coordination to manipulate the cursor or other pointing device to the desired locations on the screen. It can be very frustrating for individuals with poor fine motor coordination to use these devices to locate and select links.

As the number of WWW users, providers, and servers continues to rapidly expand, it will become increasingly important for a web user to be able to quickly and efficiently locate and select hypertext links embedded in web pages on the WWW. Without improvements in the methods and procedures for locating and selecting links, the existing limitations will continue to be an impediment to the effective usage of WWW resources.

DISCLOSURE OF THE INVENTION

According to a preferred embodiment of the present invention, an apparatus and method for locating and selecting hypertext links allows a web user to select a web page, then efficiently locate and select any hypertext link on the web page. A web user simply navigates to a web page and scrolls through the web page using the slider on the scroll bar. As the web user scrolls through the page, each link that appears on the screen is displayed in one of several predefined colors with no two adjacent links being displayed in the same color. When a given hypertext link is within range of the slider on the scroll bar, this link becomes the active link and the slider on the scroll bar changes to a color which corresponds to the color of the link. The color change provides a visual cue to the user that the active link can now be selected. When the slider changes color, an active link display on the menu bar of the web browser displays the title of the active link as indicated by an HTML tag in the web page corresponding to the link. As long as the slider remains the color corresponding to the link and the active link display shows the title of the active link, the user can select the link by simply pressing the right button of the mouse or using some other selection method.

BRIEF DESCRIPTION OF THE DRAWINGS

The preferred exemplary embodiments of the present invention will hereinafter be described in conjunction with the appended drawings, where like designations denote like elements, and.

BEST MODE FOR CARRYING OUT THE INVENTION

The method and apparatus of the present invention has particular applicability to navigating to web pages on the Internet. For those individuals who are not familiar with the Internet and World Wide Web, a brief overview of relevant Internet concepts is presented immediately below. Those who are familiar with Internet transactions and the WWW may wish to proceed directly to the Detailed Description section below.

1. Overview

Web Connection

Figure 3:
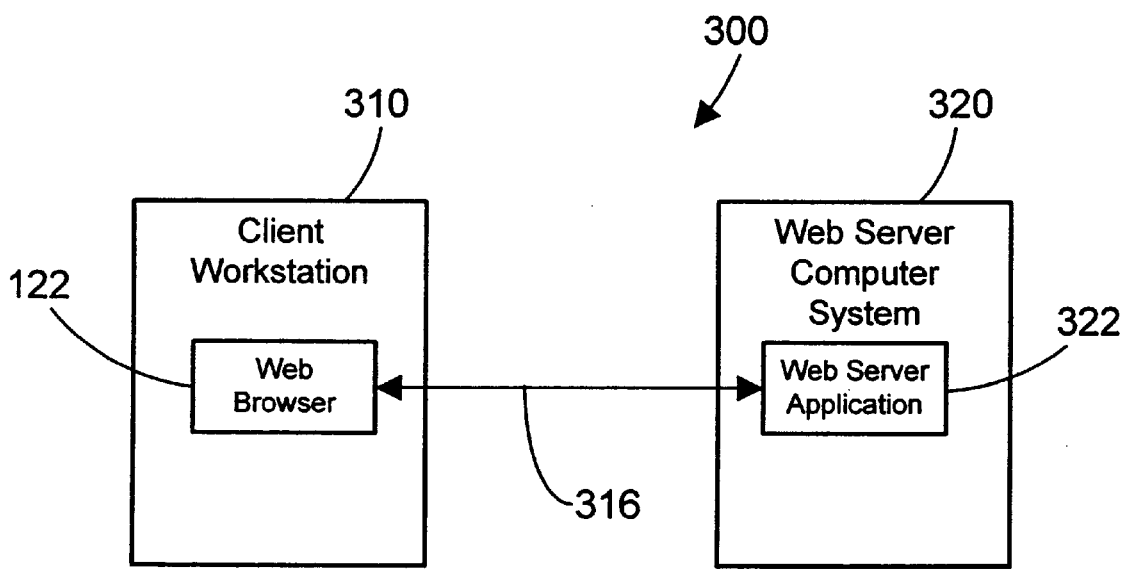
FIG. 3 is a block diagram of a typical Internet connection.

Referring now to FIG. 3, a typical connection between a standard web browser 122 running on a client workstation 310 and a web server application 322 running on a web server computer system 320 occurs over communication link or communication mechanism 316. Of course, client workstation 310 may be coupled to other computer systems via a local area network (LAN) or via any other type of computer network or other interconnection. Likewise, web server computer system 320 may be coupled to other computer systems as well. Client workstation 310 may be any computer that is capable of providing access to the WWW by using web browser 122. This would include handheld, portable or laptop computers, standard desktop computer systems, dumb terminals connected to a mainframe, etc.

Web browser 122 is a software program running on client workstation 310 that allows a user at client workstation 310 to communicate with other computers over connection 316. Web browser 122 would include any web browser which is capable of transmitting and receiving data over the WWW. This includes commercial software applications such as IBM's WebExplorer, Internet Netscape Navigator, Microsoft Internet Explorer, Apple Computer's CyberDog, and any other software application which now exists or which may be developed in the future for accessing or processing information over the Internet and WWW. The preferred embodiment for connection 316 is any suitable communication link or communication mechanism to the Internet, including a hardwired connection, telephone access via a modem or high-speed T1 line, infrared or other wireless communications, computer network communications (whether over a wire or wireless), or any other suitable connection between computers, whether currently known or developed in the future.

It should be noted that client workstation 310 and web server computer system 320 may be the same physical and/or logical computer system. Web browser 122 typically displays pages of HTML data to a user at client workstation 310. Other types of data (besides HTML) may also be transmitted to web browser 122, including text data, graphical data (e.g., Graphic Image Format (GIF) files), audio data or sound files (eg., WAV files), Java applets (executable code) and a specialized data form known as Multipurpose Internet Mail Extensions (MIME) data (which may include combinations of the foregoing and other data types).

Web server application 322 is a software program running on web server computer system 320 that allows a user at client workstation 310 to access information controlled by web server 320. One preferred embodiment of web server application 322 in accordance with the present invention is a commercial web server application such as IBM's Internet Connection Server. Other applications are also compatible with the present invention. Web server computer system 320 typically outputs web pages of to WEB browser 122 in response to requests by web browser 122 that reflect action taken by the user at client workstation 310. In addition, as explained above, web server computer system 320 may output other types of data to web browser 122 as well.

Output data may include static HTML pages (meaning that the content of the page does not vary), or may include data that must be dynamically determined and inserted into the output data. Web server application 322 may dynamically build output data (e.g., an HTML page) from parts that it retrieves from memory within web server computer system 320 or from other computer systems, or constructed at an earlier time or by another computer.

Web browser 122 typically interacts with web server application 322 by transmitting input (e.g., a Uniform Resource Locator (URL) or an HTML page) over connection 316 to web server computer system 320. This input is typically transmitted using HyperText Transfer Protocol (HTTP) 1.0, but other protocols could be used. Web server computer system 320 running web server application 322 receives the input from web browser 122, and in response, outputs data (e.g., an HTML page) to browser 122. Web server computer system 320 may also have numerous other software components, including Common Gateway Interface (CGI) programs or modules, for performing desired functions.

The process described above illustrates a basic connection over the Internet, recognizing that many details and variations that are within the scope of the present invention are not disclosed herein for the purpose of providing a simple context for understanding the concepts of the present invention.

Web Pages

A web page is primarily visual data that is intended to be displayed on the monitor of client workstation 310. Web pages are generally written in Hypertext Markup Language (HTML) or other common forms such as PDF files. When web server application 322 running on web server computer system 320 receives a web page request, it will build a web page or retrieve a file containing a pre-built web page and send it off across connection 316 to the requesting web browser 122. Web browser 122 understands HTML, and other commonly used forms and interprets it and outputs the web page to the monitor of client workstation 310. This web page displayed on the user's screen may contain text, graphics, and links. A link in a web document is a textual or graphic representation which includes an address which can used by the web browser to retrieve the associated web document when activated by the web user. (which are URL addresses of other web pages.) These other web pages (i.e., those represented by links) may be on the same or on different web servers. The user can retrieve these other web pages by clicking on these links using a mouse or other pointing device. This entire system of web pages with links to other web pages on other servers across the world collectively comprise the "World-Wide Web" (WWW).

Figure 4:
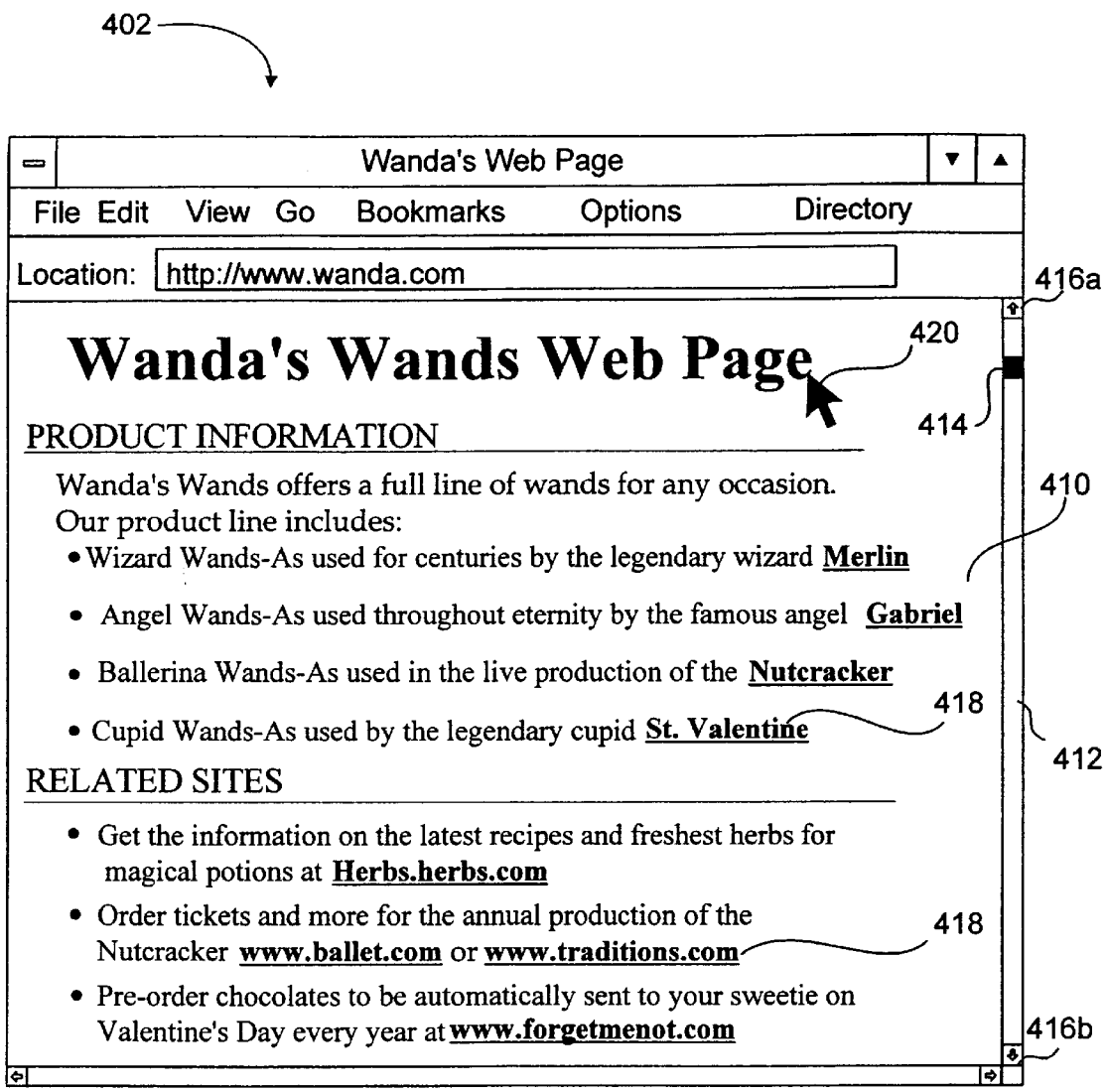
FIG. 4 is a sample web browser display showing a web page that contains multiple hypertext links.

Referring now to FIG. 4, a sample web browser user interface 402 is shown displaying a sample web page, Wanda's Wands web page 410. It should be understood that Wanda's Wands web page 410 is shown as displayed on a typical web browser, with a typical interface, that has not been modified to include a preferred embodiment of the present invention as described herein. Web browser interface 402 includes a scroll bar 412 and a slider 414 moving within scroll bar 412. Scroll bar 412 also includes an upward scrolling button 416a and a downward scrolling button 416b. Various links 418 are displayed on web page 410 in bold face type. It should be assumed for purposes of demonstrating the present invention that all unselected links 418 shown in FIG. 4 appear in one color and that all selected links 418 appear in another color. Links 418 appear underlined and in bold face type in order to distinguish links 418 from the remainder of text on web page 410. For purposes of demonstrating the present invention, it should also be assumed that the color of slider 414 in web browser interface 402 is unchanging.

Slider 414 can be positioned anywhere within the boundaries of scroll bar 412. The user typically positions slider 414 by positioning mouse cursor 420 over slider, pressing a mouse button and dragging slider 414 to the desired position within scroll bar 412. The position of slider 414 within scroll bar 412 determines what portion of sample web page 410 web browser interface 402 will display. As shown in FIG. 4, web browser interface 402 displays the top of sample web page 410 because slider 414 is in the upper portion of scroll bar 412. To clarify the relationship between the position of slider 414 within scroll bar 412 and the portion of sample web page 410 displayed by web browser interface 402, if the position of slider 414 was at the bottom of scroll bar 412, web browser interface 402 would display the bottom portion of sample web page 410. From this it can be understood that a web user manipulates the position of slider 414 within scroll bar 412 to view different portions of sample web page 410.

The user typically selects a link 418 by manipulating the position of slider 414 within scroll bar 412. As the user manipulates slider 414, the user simultaneously scans the scrolling web page 410 to locate a particular link. Once the user moves web page 410 such that link 418 is displayed, the user stops scrolling, repositions cursor 420 over link 418, and selects link 418.

2. Detailed Description

Figure 1:
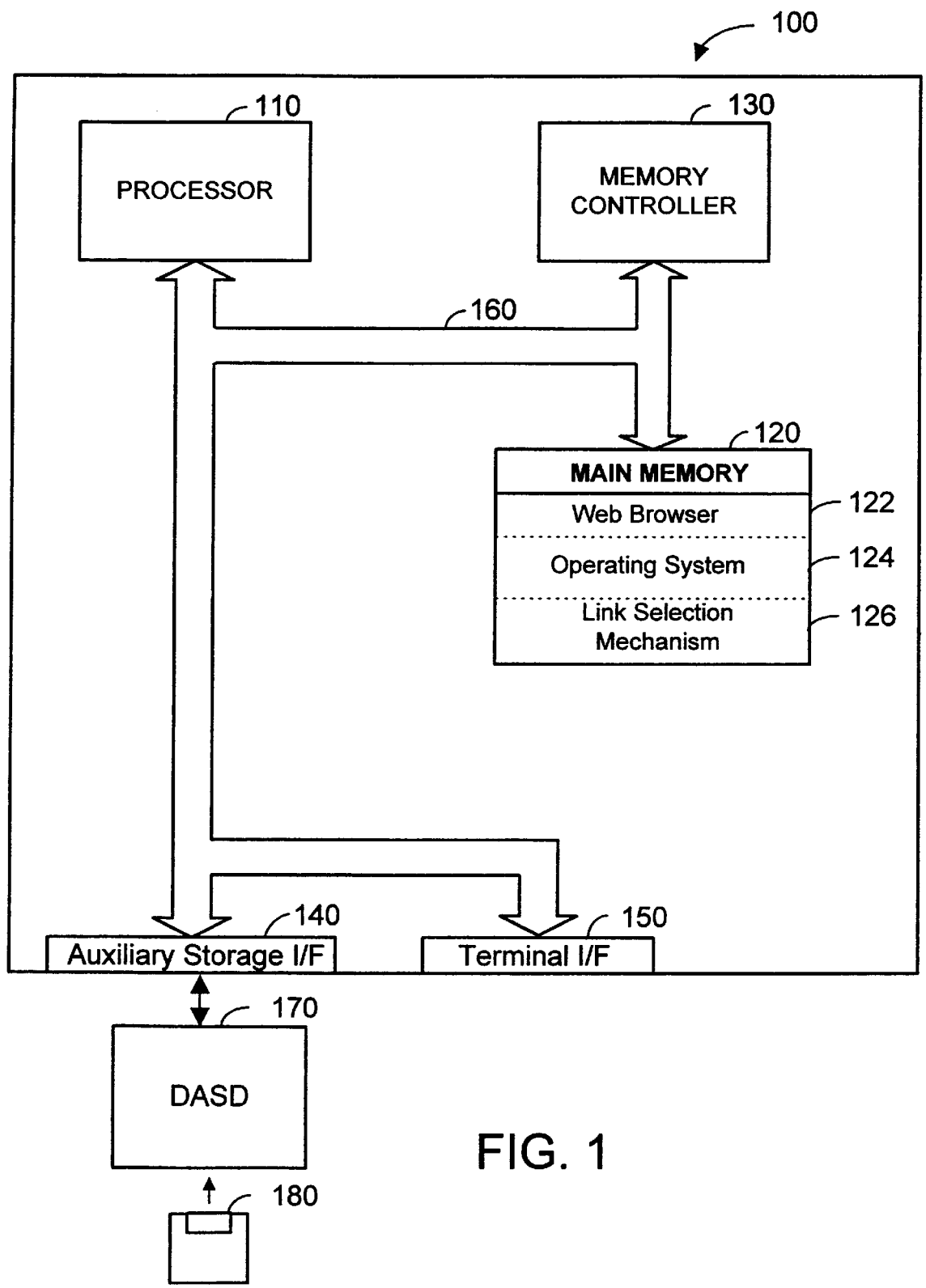
FIG. 1 is a block diagram of a computer system in accordance with a preferred embodiment of the present invention.

Referring now to FIG. 1, a computer system in accordance with a preferred embodiment of the present invention includes: a Central Processing Unit (CPU) 110; a terminal interface 150; an auxiliary storage interface 140; a Direct Access Storage Device (DASD) 170; a floppy disk 180; a bus 160; and a memory 120. In this example, memory 120 includes a web browser interface 402, an operating system 124 and a link selection mechanism 126. It should be understood that bus 160 is used to load link selection mechanism 126 into memory 120 for execution.

CPU 110 performs computation and control functions of system 100. The CPU associated with system 100 may comprise a single integrated circuit, such as a microprocessor, or may comprise any suitable number of integrated circuit devices and/or circuit boards working in cooperation to accomplish the functions of a central processing unit. CPU is capable of suitably executing the programs contained within memory 120 and acting in response to those programs or other activities that may occur in system 100.

Memory 120 is any type of memory known to those skilled in the art. This would include Dynamic Random Access Memory (DRAM), Static RAM (SRAM), flash memory, cache memory, etc. While not explicitly shown in FIG. 1, memory 120 may be a single type of memory component or may be composed of many different types of memory components. In addition, memory 120 and CPU 110 may be distributed across several different computer that collectively comprise system 100. Computer system 100 of FIG. 1 simply illustrates many of the salient features of the invention, without limitation regarding the physical location of CPU 110 or memory locations within memory 120.

Bus 160 serves to transmit programs, data, status and other forms of information or signals between the various components of system 100. The preferred embodiment for bus 160 is any suitable physical or logical means of connecting computer systems and components known to those skilled in the art. This includes, but is not limited to, direct hard-wired connections, Internet connections, Intranet connections, fiber optics, infrared (IR), etc. Many alternative methods and material for connecting computer systems and components may readily adapted for use with the present invention. This includes methods and materials not presently known but developed in the future.

Terminal interface 150 allows human users to communicate with system 100. Auxiliary storage interface 140 represents any method of interfacing a storage apparatus to a computer system known to those skilled in the art. Auxiliary storage interface 160 allows auxiliary storage devices such as DASD 170 to be attached to and communicate with the other components of system 100. While only one auxiliary storage interface 160 is shown, multiple interfaces and multiple auxiliary storage devices such as DASD 170 are possible. As shown in FIG. 1, DASD 170 may be a floppy disk drive which is capable of reading and writing programs or data on floppy disk 180. DASD 170 may also be any other type of DASD known to those skilled in the art. This includes CD-ROM drives, hard disk drives, optical drives, etc. Floppy disk 180 represents a typical 3.5 inch magnetic media disk known to those skilled in the art.

Figure 2:
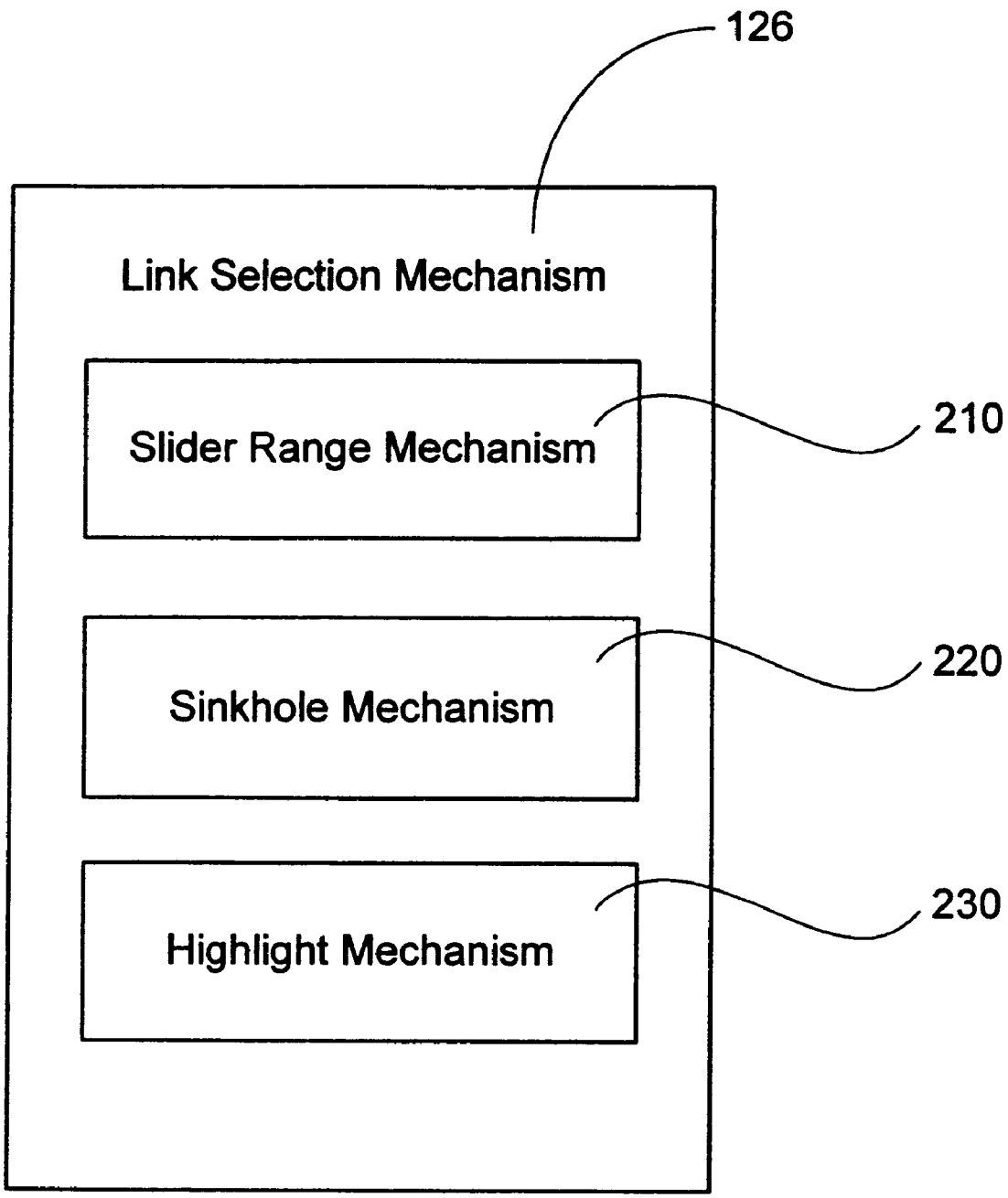
FIG. 2 is a block diagram of a computer system depicting the components of a preferred embodiment of the present invention.

Referring now to FIG. 2, a block diagram depicting the components of a preferred embodiment of the present invention is shown. Link selection mechanism 126 includes a slider range mechanism 210, a sinkhole mechanism 220 and a highlight mechanism 230. Link selection mechanism 126 activates slider range mechanism 210 as soon as the web user begins to scroll through a web page containing various links (not shown). Slider range mechanism 210 determines whether any links are located within a slider range. The slider range is a predefined portion of the current web document. There are several ways in which the slider range can be implemented. For example, the slider range could comprise several lines of the web page adjacent to the current position of the slider on the computer screen. In another embodiment, the slider range could comprise the portion of the document in the center range of the display area. In another alternate embodiment, the slider range could also be the entire portion of the web document shown in the display area. The illustrated embodiment shown in FIGS. 7–10 shows the slider range comprised of several lines of the web page adjacent to the current position of the slider on the computer screen.

If slider range mechanism 126 detects that more than one link is located within the slider range, link selection mechanism 126 activates sinkhole mechanism 220 to slow the rate of scrolling by a factor proportional to the number of links within the slider range. Sinkhole mechanism 220 selects the current link based upon the current position of the slider within the scroll bar, the previous position of the slider within the scroll bar and the number of links within the slider range.

If there is only one link within the slider range, link selection mechanism 126 designates the link as the current link. The user may also locate a link using tabs on the web browser. When the user locates a link using tabs on the web browser, link selection mechanism 126 designates this link as the current link. Once the current link has been determined, link selection mechanism 126 activates highlight mechanism 230 to update the color of the slider on the scroll bar to correspond with the color of the current link.

Figure 5:
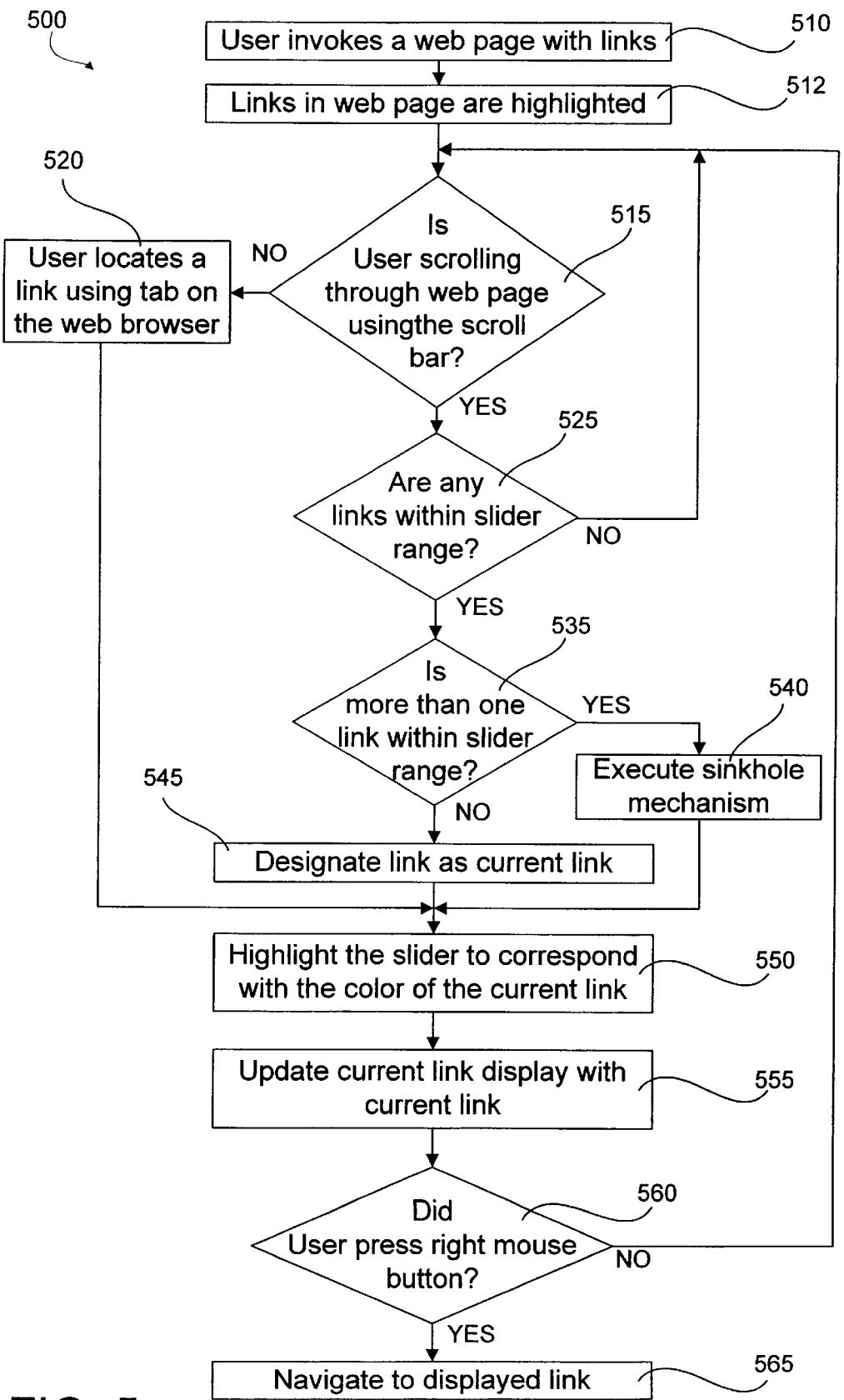
FIG. 5 is a flow diagram of the method steps for fast-path location and selection of hypertext links in accordance with a preferred embodiment of the present invention.

Referring now to FIG. 5, a method 500 in accordance with a preferred embodiment of the present invention is shown. The preferred method aids the web user in efficiently locating and selecting the desired link using the scroll bar or tab keys on the web browser. In order to utilize the present invention, the user must first invoke a web page which contains links (step 510). It should be assumed for purposes of demonstrating the present invention that the web page contains at least one link which the user wishes to locate and select. The link selection mechanism is preferably activated once the web browser interface is invoked. Once web page is invoked, the link selection mechanism highlights each link on the web page in one of several predefined colors (step 512). It should be understood that no two adjacent links on the web page appear on the display in the same color and that the term adjacent links is meant to describe links as encountered by the user when reading down a web page from left to right.

Once the user invokes the web browser interface, the link selection mechanism determines whether the user is scrolling through the web page using the scroll bar (step 515). If the user is not using the scroll bar to scroll through the web page (step 515 NO), the user may be using tabs on the web browser interface to locate a link (step 520). If the user scrolls through the web page using the scroll bar (step 515 =YES), slider range mechanism checks whether any links are within the slider range (step 525). The slider range may be described as a zone which encompasses a predefined range of lines. The position of the slider range corresponds with the position of the slider. For example, when the user scrolls down the web page using the slider, the slider range also scrolls down the web page.

If there are no links within the slider range (step 525= NO), the link selection mechanism allows the user to continue to scroll, either by using the scroll bar (step 515) or by using a tab on the web browser (step 520). If the slider range mechanism detects that a link is within the slider range (step 525=YES), the link selection mechanism checks to see whether more than one link is within the slider range (step 535). If there is more than one link within the slider range (step 535=YES), the link selection mechanism activates the sinkhole mechanism (step 540) to slow the rate of scrolling by a factor proportional to the number of links within the slider range. The sinkhole mechanism determines the current link based upon the current position of the slider, the previous position and the number of links within the slider range. The sinkhole mechanism will be described in more detail in a subsequent figure.

If there is only one link within the slider range (step 535=NO) or the user located a link using a tab (step 520), the link selection mechanism designates this link as the current link (step 545). This process of designating the current link (step 545) depends upon the position of the slider on the scroll bar. A particular link on the web page can only be selected as the current link if the slider on the scroll bar is positioned so that the link falls within the slider range. At this point, it can be said that the current link is associated with the scroll bar, more particularly, the position of the slider on the scroll bar. Once the current link has been designated, either by the sinkhole mechanism (step 540) or by the link selection mechanism the highlight mechanism updates the color of the slider on the scroll bar to correspond with the color of the current link (step 550).

Once the highlight mechanism changes the color of the slider to correspond with the color of the current link, the link selection mechanism updates a current link display on the menu bar of the web browser to display the title of the current link as indicated by an HTML tag in the web page corresponding to the current link (step 555).

As long as the color of the slider matches the current link and the current link display shows the title of the current link, the web user can select the link by simply pressing the right mouse button. It should be understood that any other suitable mechanism now known or later developed can be used to select the link. The link selection mechanism then determines whether the web user pressed the right mouse button (step 560). If the right mouse button was pressed (step 560=YES), the web browser navigates to the corresponding web site (step 565). If the user did not press the right mouse button (step 560=NO), the link selection mechanism 126 returns to step 515.

Figure 6:
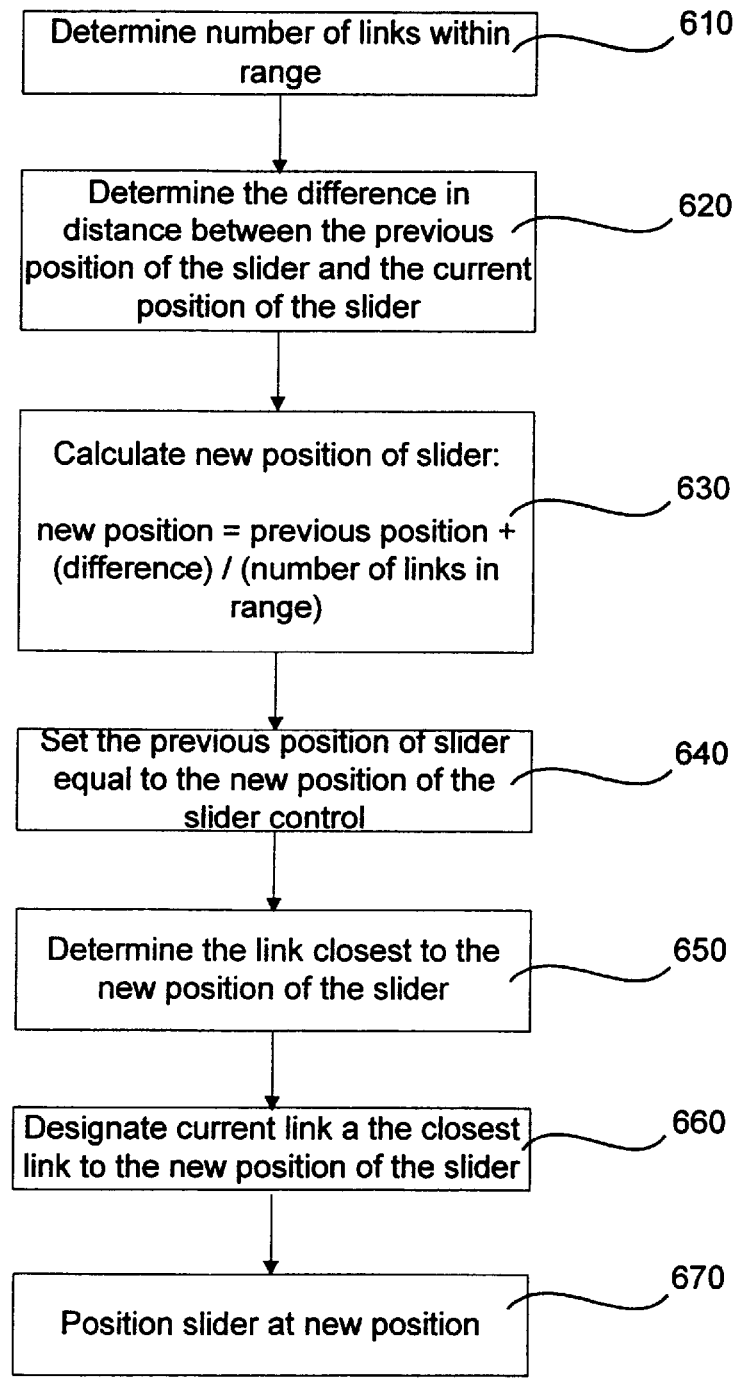
FIG. 6 is a flow diagram of a sinkhole mechanism for fast-path location and selection of links in accordance with a preferred embodiment of the present invention.

Referring now to FIG. 6, a process or methodology for implementing the sinkhole mechanism in accordance with a preferred embodiment of the present invention is shown. As mentioned, when slider range mechanism detects that more than one link is positioned within the slider range, the link selection mechanism executes the sinkhole mechanism in order to slow the scroll rate by a factor proportionate to the number of links within the slider range. The scroll rate can be described as the rate at which portions of the web page scroll by the user on the display. The sinkhole mechanism prevents the cluster of links from scrolling by too quickly by calculating the new position for the slider based upon the old position of the slider, the current position of the slider and the number of links within the slider range. The new position of the slider determines which link within the cluster of links will be the current link available for selection by the user.

As shown in FIG. 6, the sinkhole mechanism calculates the new position of the slider based upon, the previous position of the slider, the current position of the slider and the number of links within the slider range. The sinkhole mechanism first determines the number of links within the slider range (step 610). The sinkhole mechanism then determines the difference in distance between the previous position of the slider on the scroll bar and the current position of the slider on the scroll bar (step 620). The previous position of the slider on the scroll bar is the position the slider was in before the user began manipulating the position of the slider within the scroll bar, whereas the current position is the position of the slider within the scroll bar when the link selection mechanism activated the sinkhole mechanism. Once the sinkhole mechanism determines the difference between the previous position of the slider and the current position of the slider (step 620), the sinkhole mechanism calculates the new position for the slider on the scroll bar (step 630).

The new position of the slider is equal to the previous position of the slider plus the result of dividing the difference (calculated in the previous step) by the number of links within the slider range (step 635). After calculating the new position of slider, the sinkhole mechanism saves the new position of the slider as the previous position of the slider which aids in the calculation of the new position when the sinkhole mechanism executes again. The sinkhole mechanism then determines the link closest to the new position of the slider (step 640). After the closest link is determined, the highlight mechanism 230 updates the color of the slider to correspond with the color of the current link (step 645). The step of updating the color of the slider to substantially correspond with the color of the current link provides a visual correlation between the current link and the scroll bar. The sinkhole mechanism then positions the slider at the new position (step 650).

The sinkhole mechanism executes each time the slider range mechanism detects that more than one link is within the slider range. The calculation of the new position of the slider, described above, on the scroll bar slows the rate of scrolling by a factor in proportion to the number of links within the slider range. This causes the calculation of the new position for the slider to gradually increase. The new position of the slider on the scroll bar will gradually increase to a position where the closest link is different from the current link. Once the closest link differs from the current link, the sinkhole mechanism updates current link to the closest link.

The function of the preferred embodiment disclosed herein may be best understood from a web user's viewpoint as shown in FIGS. 7–10. To demonstrate the preferred embodiment of the present invention, we assume for FIGS. 7–10 that the web user wishes to select a given link from Wanda's Wands web page using the scroll bar.

Web browser interface 402 is representative of a typical web browser interface as modified in accordance with the preferred embodiment of the present invention. It is anticipated that any existing or future web browser can be modified to utilize the apparatus and methods of present invention.

Figure 7:
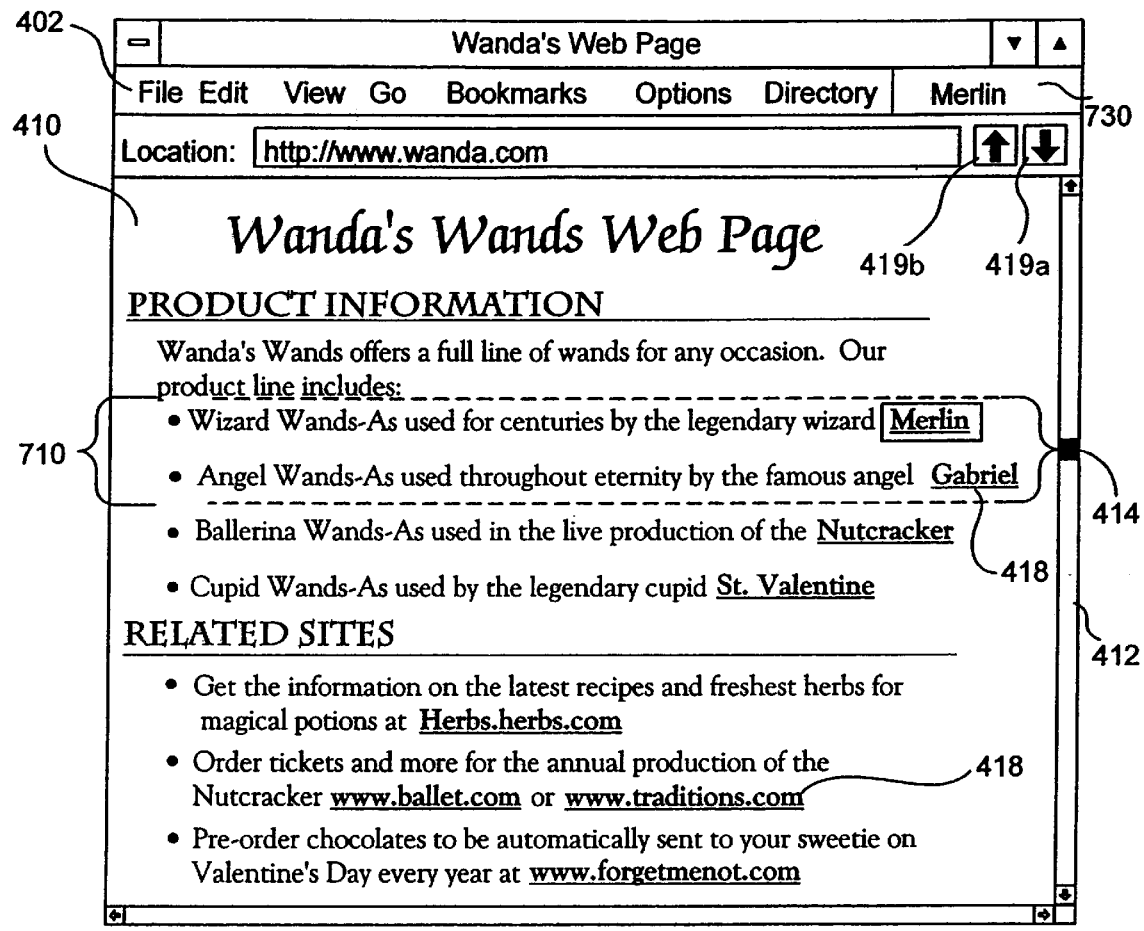
FIG. 7 is a sample display showing a web page where the slider range is positioned over a link and the color of the slider corresponds with the color of the link.

Referring now to FIG. 7, sample web page 410 is again shown and now web browser interface 402 has been modified in accordance with a preferred embodiment of the present invention. It should be understood that the present invention can be used in conjunction with any document displayed on a web browser which contains a plurality of links. As mentioned, scroll bar 412 allows the web user to change the portion of sample web page 410 displayed by web browser interface 402. In accordance with a preferred embodiment of the present invention, scroll bar 412 can also be used to select and locate a desired link.

Sample web page 410 now includes differently colored links 418, a slider range 710, tabs 416*a* and 416*b* and a current link display 730. In accordance with the present invention, each link 418 on sample web page 410 appears in one of several predefined colors, with no two adjacent links 418 having the same color. Since the figures provided with this specification are only in black and white, it should be assumed for purposes of demonstrating the present invention that each link 418 on sample web page 410 appears in one of several possible colors and that no two adjacent links 418 have the same color.

As shown in FIG. 7, the position of slider 414 has been adjusted by the user so that slider 414 is positioned slightly farther down scroll bar 412. It should be assumed that the user has selected and dragged slider 414 to its current position using the mouse cursor (not shown), or some other acceptable selection apparatus. The area between the two horizontal dashed lines shown in FIG. 7 is the slider range 710 for slider 414 on scroll bar 412. As slider 414 control scrolls down through web page 410, links 418 enter slider range 710. In FIG. 7, two links are within slider range 710, Merlin 418*a* and Gabriel 418*b*. It should be understood that the horizontal dashed lines shown in FIGS. 7 through 10 are only to provide clarity in understanding the implementation of a preferred embodiment of the present invention. These horizontal lines do not actually appear on the display to the web user.

Tabs 416*a* and 416*b* can also be used to locate various links on web browser. Tabs 416*a* and 416*b* eliminate the need to scroll through web page 410 by allowing the user to jump from link to link. User simply presses tab 416*a* to advance to the next link on web page 410. Conversely, user presses tab 416*b* to return to the previous link on web page 410. Once the user tabs to the desired link 418 using tab 416*a* or tab 416*b*, the user may simply press the right mouse button to navigate to the desired link.

As mentioned, when the slider range mechanism detects that more than one link 418 exists within slider range 710, link selection mechanism 126 activates sinkhole mechanism 220. To provide understanding of the sequence of execution of the present invention, it should be understood that since two links 418 are located within slider range 710 in FIG. 7, the link selection mechanism activates the sinkhole mechanism. The sinkhole mechanism slows the rate of scrolling in proportion to the number of links within slider range 710. The sinkhole mechanism slows the rate of scrolling by calculating the new position of slider 414 within scroll bar 412 based upon the previous position of slider 414, the current position of slider 414 and the number of links 418 within slider range 710. Once the sinkhole mechanism calculates the new position of slider 414, the sinkhole mechanism determines the closest link to the new position of slider 414 and assigns this link as the current link. The link selection mechanism then activates the highlight mechanism which updates the color of slider 414 on scroll bar 412 to correspond with the color of the current link. The link selection mechanism then updates current link display 730 to contain the name of the current link, as specified in an HTML tag in the web page corresponding to the current link.

As shown in FIG. 7, two links 418 are within slider range 710, Merlin 418a and Gabriel 418b. It can be assumed that the sinkhole mechanism has calculated the current link to be Merlin 418a since a box has been drawn around link Merlin 418a. As mentioned, since FIG. 7 is shown only in black and white the figure does not accurately depict the colors on the screen provided by the present invention. A preferred embodiment of the present invention displays links on the web page using various colors such that no two adjacent links have the same color. It should also be understood that a box does not actually appear around the current link. Rather, it should be understood that the present invention updates the color of slider 414 on scroll bar 412 to correspond with the color of a current link. In FIG. 7, link Merlin 418a has been designated by the sinkhole mechanism as the current link. Current link display 730 contains "Merlin" to further indicate that the current link is link Merlin 418a.

As mentioned, the user can select the current link as long as the color of slider 414 on scroll bar 412 coincides with the color of the desired link and the name of the desired link appears in current link display 730. In FIG. 7, current link Merlin 418a can be selected by the user as long as slider 414 on scroll bar 412 coincides with the color of link Merlin 418a and as long as "Merlin" appears within current link display 730. As mentioned, the user can select the link by simply activating a user input device or any pointing device, such as a mouse. Once the user clicks the right mouse button, web browser 410 navigates to the web page corresponding to link Merlin 418a. The present invention easily navigates the user to the desired link without the cumbersome process of locating a desired link, repositioning the mouse and selecting the link.

Figure 8:
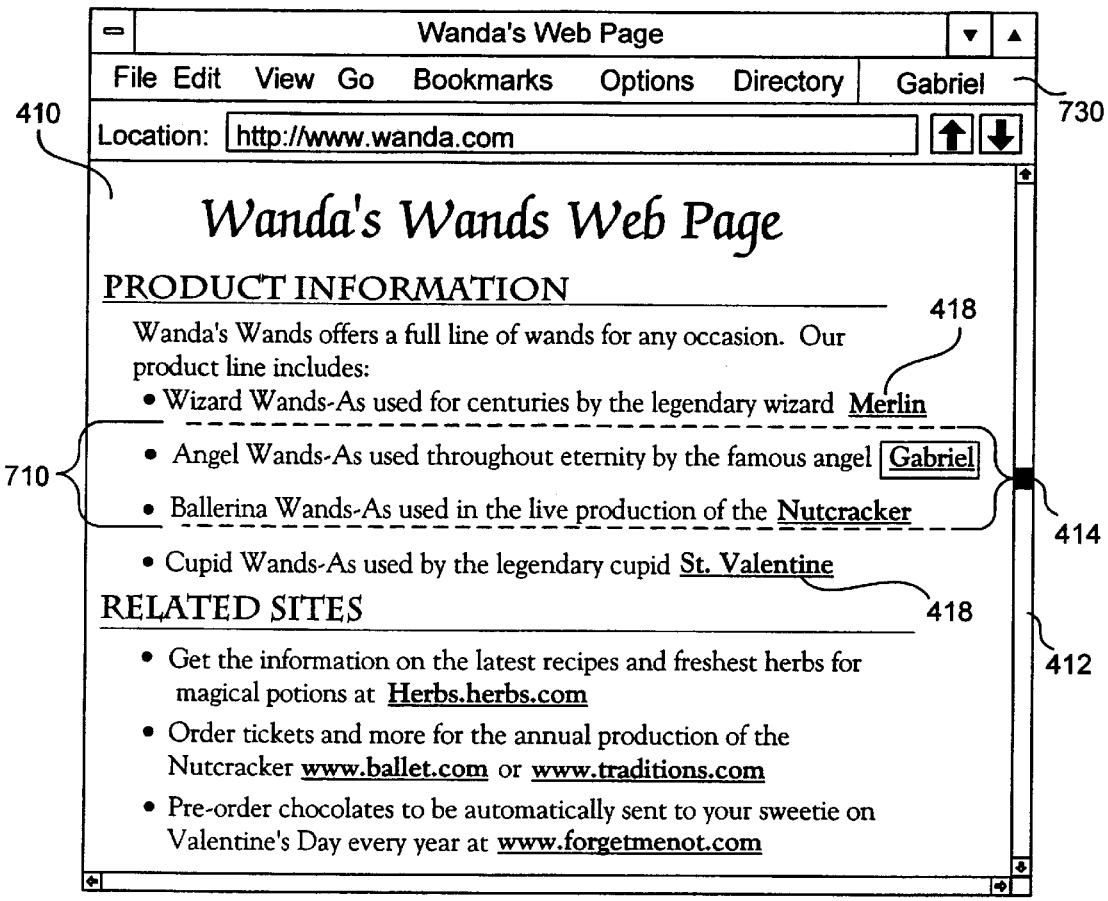
FIG. 8 is a sample display showing a web page where the slider range has been repositioned over a second link and the color of the slider has been updated to correspond with the color of the second link.

Now referring to FIG. 8, sample web page 410 is again shown and the position of slider 414 on scroll bar 412 is just lower than its previous position. It should be assumed that the user has selected and dragged slider 414 to its current position using the mouse cursor (not shown), as described above. FIG. 8 is shown to provide clarity of sinkhole mechanism 220. As mentioned, when the slider range mechanism detects more than one link within slider range 710, the sinkhole mechanism executes to prevent links 418 from scrolling by too quickly. In FIG. 8, since two links, are within slider range 710, Merlin 418a and Gabriel 418b, it can be assumed that the sinkhole mechanism has been executed.

As mentioned, the sinkhole mechanism prevents links 418 located within slider range 710 from scrolling by too quickly. The sinkhole mechanism simply slows the rate of scrolling in proportion to the number of links within slider range 710. As explained in greater detail above, the new position of slider 414 on scroll bar 412 is based upon the current position of slider 414, the previous position of slider 414 and the number of links 418 within slider range 710.

Since slider 414 has advanced down scroll bar 412, it can be assumed that the sinkhole mechanism has executed and that the new position of slider 414 on scroll bar 412 has been calculated in proportion to the number of links 418 within scroll range. As is shown in FIG. 8, slider 414 is no longer the color of link Merlin 418a. Rather the color of slider 414 now corresponds with the color of link Gabriel 418b. Further, current link display 730 shows "Gabriel". The user can select link Gabriel 418b as long as the color of slider 414 corresponds with the color of link Gabriel 418b and current link display 730 shows "Gabriel". As mentioned, the user can select a link by simply clicking the right mouse button.

Figure 9:
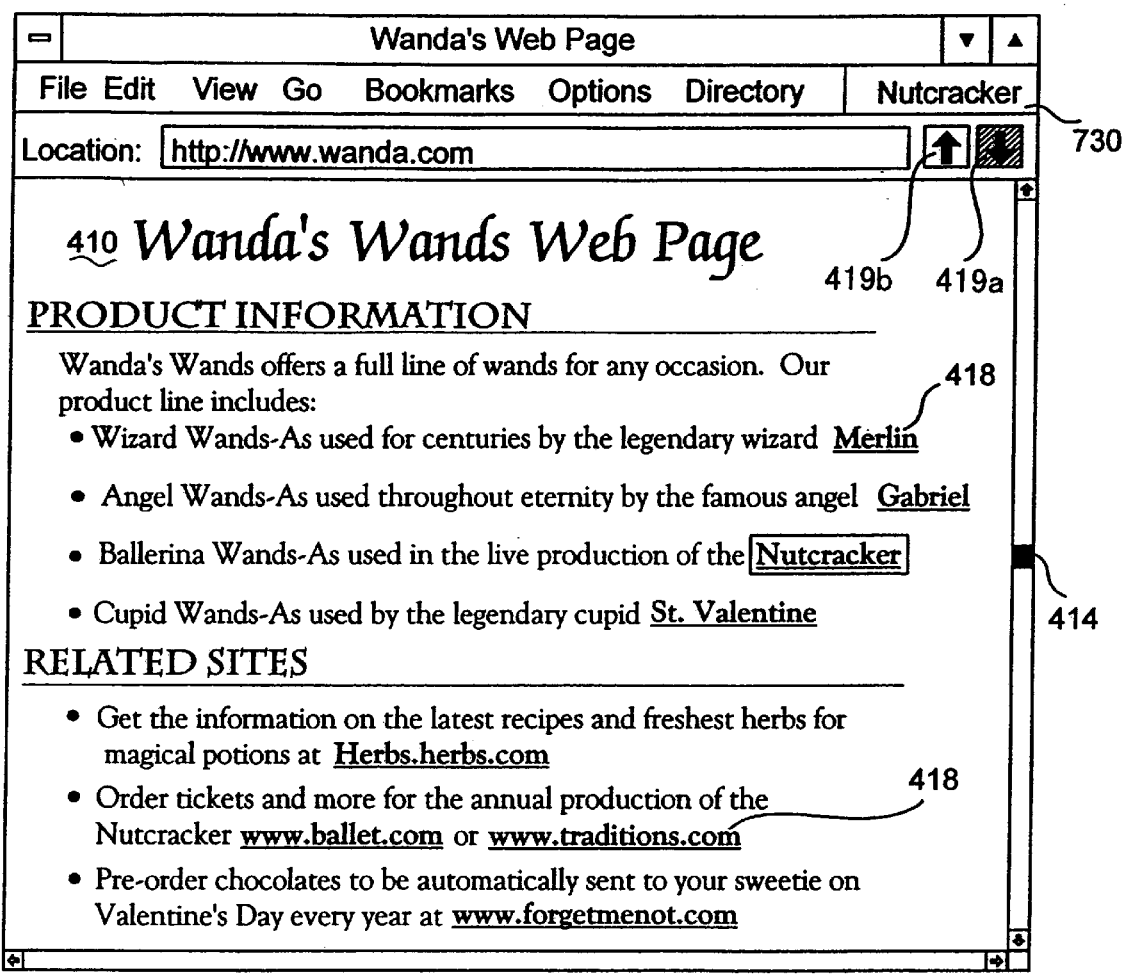
FIG. 9 is a sample display showing a web page where the user has jumped to a third link on the web page using a tab key and the color of the slider has been updated to correspond with the color of the third link.

Referring now to FIG. 9, tab 416a is now crosshatched to indicate that the user has activated tab 416a to jump to the next link 418 on web page 410. As shown in FIG. 9, slider 414 was positioned so that the previous link available for selection was link Gabriel 418b. Thus, it should be assumed for purposes of demonstrating the example, that if the user pressed tab 416a when located on link Gabriel 418b, the link selection mechanism jumped the user to the next link on web page 410, link Nutcracker 418c. It should also be understood that the user can jump to the next link without pressing tab 416b. Rather, the user can jump to the next tab by simultaneously holding down the shift key and the tab key on the keyboard (not shown).

When the link selection mechanism detects that the user has jumped to a link using tabs 416a or 416b or the keyboard as described above, the link selection mechanism designates the link as the current link. Once the link selection mechanism designates the current link, the highlight mechanism updated so that the color of slider 414 corresponds with the color of the current link. After highlight mechanism 230 updates the color of slider 414 to correspond with the color of the current link, the link selection mechanism updates current link display 730 to include the name of the current link. As shown in FIG. 9, the color of slider 414 corresponds with the color of link Nutcracker 418c. The user can select link Nutcracker 418c as long as slider 414 remains the same color as link Nutcracker 418c and current link display 730 contains "Nutcracker".

Figure 10:
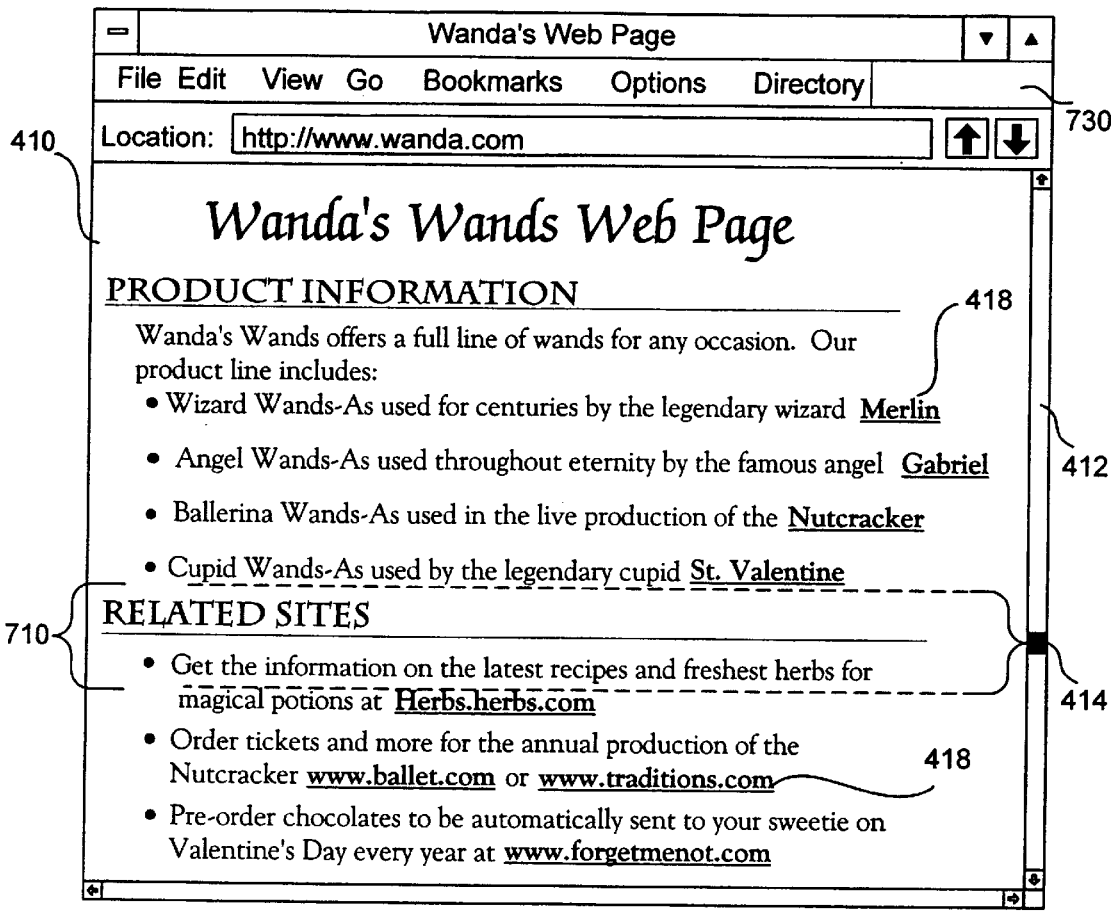
FIG. 10 is a sample display showing a web page where the slider range is not positioned over a link.

Referring now to FIG. 10, slider 414 is now positioned farther down scroll bar 412. It should be assumed that the user has selected and dragged slider 414 to its current position using the mouse cursor (not shown), as described above. There are no links 418 located within slider range 710 and the color of slider 414 has returned to its original color (as shown in FIG. 4). Further, current link display 730 is empty. When slider 414 is its original color and current link display 730 is empty, this indicates to the user that there is no link currently available for selection.

While the invention has been particularly shown and described with reference to preferred exemplary embodiments thereof, it will be understood by those skilled in the art that various changes in form and details may be made therein without departing from the spirit and scope of the invention. For example in FIG. 7 links 418 appear on sample web page 410 in black. However, it should be understood that link 418a may appear on web page 410 as red, link 41 Sb may appear on web page 410 as blue and link 418c may appear on web page 410 as green.

What is claimed is:

1. An apparatus comprising:
   at least one processor;
   a memory coupled to the at least one processor; and
   a link selection mechanism residing in the memory and executed by the at least one processor, the link selection mechanism determining a current link in a document containing a plurality of links, the current link being determined based upon a position of a slider on a scroll bar, the link selection mechanism visually correlating the slider with the current link to indicate to a user which of the plurality of links is the current link, and to facilitate user selection and activation of the current link.

2. The apparatus of claim 1 wherein the scroll bar comprises an upward s scrolling button and a downward scrolling button.

3. The apparatus of claim 1 wherein the link selection mechanism visually correlates the slider with the current link by coloring the slider to substantially match the current link.

4. The apparatus of claim 1 further comprising a user input device that facilitates the selection and activation of the current link, and wherein the user activates the user input device to activate the current link.

5. The apparatus of claim 1 wherein the link selection mechanism further comprises a slider range mechanism, the slider range mechanism defining a slider range within the document.

6. The apparatus of claim 5 wherein the slider range comprises a predefined number of lines in the document.

7. The apparatus of claim 5 wherein the slider range mechanism detects the number of links within the slider range.

8. The apparatus of claim 5 wherein the link selection mechanism further comprises a sinkhole mechanism, wherein the link selection mechanism activates the sinkhole mechanism when more than one link is within the slider range, and wherein the sinkhole mechanism slows the rate of scrolling in proportion to the number of links within the slider range.

9. The apparatus of claim 1 wherein:
   the link selection mechanism applies a color to each of the plurality of links such that no two adjacent links on the document have the same color.

10. An apparatus comprising:
    at least one processor;
    a memory coupled to the at least one processor;
    a web browser residing in memory, the web browser retrieving and displaying a document containing a plurality of links, the web browser including a scroll bar having, a slider for navigating through the document;
    a link selection mechanism residing in the memory, wherein the link selection mechanism applies a color to each of the plurality of links on the document using alternating colors, the link selection mechanism determining which of the plurality of links is a current link based upon a position of the slider on a scroll bar and facilitating user selection and activation of the current link, the link selection mechanism comprising:
    a slider range mechanism, the slider range mechanism defining a slider range in the document; and
    a highlight mechanism, the highlight mechanism updating the color of the slider on the scroll bar on the web browser to correspond with the color of a current link, and
    a user input device, wherein activation of the user input device activates the current link.

11. The apparatus of claim 10 wherein the user input device is activated by pressing the right mouse button.

12. The apparatus of claim 10 wherein the user input device is a tab key.

13. The apparatus of claim 10 wherein the slider range comprises a predefined number of lines of the document.

14. The apparatus of claim 10 wherein the slider range mechanism determines how many of the plurality of links are within the slider range.

15. The apparatus of claim 10 wherein the link selection mechanism further comprises a sinkhole mechanism, wherein the link selection mechanism activates the sinkhole mechanism when more than one link is within the slider range, and wherein the sinkhole mechanism slows the scrolling rate of the document displayed on the web browser in proportion to the number of links within the slider range.

16. The apparatus of claim 15 wherein the sinkhole mechanism calculates a difference in distance between a previous position of the slider on the scroll bar and the current position of the slider on the scroll bar.

17. The apparatus of claim 16 wherein the sinkhole mechanism calculates a new position for the slider on the scroll bar by adding the previous position of the slider to the result of dividing the difference by the number of links within the slider range.

18. The apparatus of claim 17 wherein the sinkhole mechanism sets the previous position of the slider equal to the new position of the slider on the scroll bar.

19. The apparatus of claim 18 wherein the sinkhole mechanism determines a current link based upon the new position of the slider.

20. The apparatus of claim 18 wherein the sinkhole mechanism positions the slider at the new position on the scroll bar.

21. A program product comprising:
    (A) a link selection mechanism determining a current link in a document containing a plurality of links, the current link being determined based upon a position of a slider on a scroll bar, the link selection mechanism visually correlating the slider with the current link to indicate to a user which of the plurality of links is the current link, and to facilitate selection and activation of the current link by a user input device; and
    (B) signal bearing media bearing the link selection mechanism.

22. The program product of claim 21 wherein the signal bearing media comprises transmission media.

23. The program product of claim 21 wherein the signal bearing media comprises recordable media.

24. The program product of claim 21 wherein the scroll bar comprises an upward scrolling button and a downward scrolling button.

25. The program product of claim 21 wherein the current link further comprises a color and wherein the link selection mechanism visually correlates the slider with the current link by coloring the slider to substantially match the color of the current link.

26. The program product of claim 21 wherein the user input device is a mouse comprising a mouse button, and wherein pressing the mouse button activates the current link.

27. The program product of claim 21 wherein the link selection mechanism includes a slider range mechanism, the slider range mechanism defining a slider range of the document.

28. The program product of claim 27 wherein the slider range comprises a predefined number of lines of the document.

29. The program product of claim 27 wherein the slider range mechanism detects the number of links within the slider range.

30. The program product of claim 27 wherein the link selection mechanism includes a sinkhole mechanism, wherein the link selection mechanism activates the sinkhole mechanism when more than one link is within the slider range, and wherein the sinkhole mechanism slows the rate of scrolling in proportion to the number of links within the slider range.

31. A method for locating and selecting links, the method comprising the steps of:
   a) displaying a web browser having a slider on a scroll bar, the web browser displaying a document containing a plurality of links;
   b) determining a current link from the plurality of links based upon a position of the slider;
   c) visually correlating the slider with the current link, and
   d) facilitating user selection and activation of the current link.

32. The method of claim 31 wherein the step of visually correlating the slider with the current link comprises coloring the slider on the scroll bar to substantially match the current link.

33. The method of claim 31 further comprising the step of defining a slider range of the document, the slider range comprising a predefined number of lines of the document, wherein the slider range mechanism detects the number of links within the slider range.

34. The method of claim 33 further comprising the step of slowing the rate of scrolling in proportion to the number of links within the slider range.

35. The method of claim 31 further comprising the step of coloring the plurality of links with a plurality of alternating colors.

36. The method of claim 31 wherein the step of facilitating user selection and activation of the current link comprises the steps of receiving input from a user of the web browser and requesting a new web document corresponding to the current link.

37. The method of claim 36 wherein the step of receiving input from a user of the web browser comprises the step of determining that the right button on a mouse has been pressed.

38. The method of claim 31 further comprising the steps of:
   determining a new current link from the plurality of links;
   visually correlating the scroll bar with the new current link; and
   facilitating user selection and activation of the new current link.

39. The method of claim 38 wherein the step of determining a new current link is performed automatically when a user of the web browser scrolls through the web document.

40. The method of claim 39 wherein the step of determining a new current link comprises locating a link in the plurality of links which is most closely aligned with a slider in the scroll bar.

41. A method for locating and selecting links, the method comprising the steps of:
   a) displaying a web browser document on a web browser having a scroll bar and a slider on the scroll bar, the web browser document including a plurality of links;
   b) displaying the plurality of links such that adjacent links are displayed in different colors;
   c) determining one of the plurality of links to be a current link based on a position of the slider;
   d) displaying the slider in the same color as the current link;
   e) as the web browser document is scrolled, determining a new one of the plurality of links to be a new current link based on a new position of the slider;
   f) displaying the scroll bar in the same color as the new current link;
   g) receiving input that the right button of a mouse has been pressed; and
   h) displaying a new web page corresponding to the new current link.

42. The method of claim 41 wherein the step of displaying the scroll bar in the same color as the current link comprises the step of applying a plurality of colors to the plurality of links in an alternating fashion so that no two adjacent links have the same color.

43. The method of claim 41 wherein the step of determining one of the plurality of links to be a current link comprises the step of creating a slider range.

44. The method of claim 43 wherein the step of determining one of the plurality of links to be the current link further comprises the step of determining how many of the plurality of links are within the slider range.

45. The method of claim 44 wherein the step of determining one of the plurality of links to be the current link further comprises the step of slowing the scrolling rate of the document displayed on the web browser in proportion to the number of links within the slider range.

46. The method of claim 45 wherein the step of determining one of the plurality of links to be the current link further comprises the step of calculating a difference in distance between a previous position of the slider on the scroll bar and the current position of the slider on the scroll bar.

47. The method of claim 46 wherein the step of determining one of the plurality of links to be the current link further comprises the step of calculating a new position for the slider on the scroll bar further comprises the step of adding the previous position of the slider to the result of dividing the difference by the number of links within the slider range.

48. The method of claim 47 wherein the step of calculating a new position for the slider on the scroll bar further comprises the step of setting the previous position of the slider equal to the new position of the slider on the scroll bar.

49. The method of claim 48 wherein the step of calculating a new position for the slider on the scroll bar further comprises the step of determining a current link based upon the new position of the slider.

50. A method for locating and selecting hypertext links comprising the steps of:
   a) displaying the web browser document on a web browser having a scroll bar, the scroll bar including a slider and the web browser document including a plurality of links;
   b) coloring each of the plurality of links with a color such that adjacent links comprise different colors;
   c) designating a portion of the document a slider range;
   d) determining how many of the plurality of links are within the slider range;
   e) designating one of the plurality of links that is most closely aligned with the slider as a current link;
   f) coloring the slider a color substantially matching the current link color;
   g) displaying a name associated with the current link in a current link display;

h) when the relative position of the slider has changed designating a new one of the plurality of links most closely aligned with the slider as a new current link;

i) coloring the slider a color substantially matching the new current link color; and j) requesting a new web browser document corresponding to the new current link when a user device input is received.

51. The method of claim 50 further comprising the step of adjusting a scroll rate of the web browser document in proportion to how many of the plurality of links are within the slider range.

52. The method of claim 50 wherein the step of requesting a new web browser document corresponding to the new current link when a user device input is received comprises the step of requesting a new web browser document corresponding to the new current link when a right button on a mouse is pressed.

* * * * *

UNITED STATES PATENT AND TRADEMARK OFFICE
CERTIFICATE OF CORRECTION

PATENT NO. : 6,222,541 B1                              Page 1 of 1
DATED      : April 24, 2001
INVENTOR(S) : Cary Lee Bates; Paul Reuben Day It is certified that error appears in the above-identified patent and that said Letters Patent is hereby corrected as shown below:

Column 10,
Line 34, "416a and 416b" should be -- 419a and 419b --.
Line 60, "416a and 416b" should be -- 419a and 419b --.
Line 61, "416a and 416b" should be -- 419a and 419b --.
Line 63, "416a" should be -- 419a --.
Line 65, "416b" should be -- 419b --.
Line 67, "416a or tab 416b" should be -- 419a or tab 419b --.

Column 12,
Line 21, "416a" should be -- 419a --.
Line 22, "416a" should be -- 419a --.
Line 27, "416a" should be -- 419a --.
Line 31, "416b" should be -- 419b --.
Line 35, "416a or 416b" should be --419a or 419b --.

Column 13, claim 2,
Line 16, after "upward" delete -- s --.

Signed and Sealed this

Fifth Day of March, 2002

Attest:

JAMES E. ROGAN
*Attesting Officer*        *Director of the United States Patent and Trademark Office*